(12) United States Patent
Higginson et al.

(10) Patent No.: US 8,091,808 B2
(45) Date of Patent: Jan. 10, 2012

(54) REDUNDANT TIRE AND RUBBER COMPOUND REPROCESSING

(75) Inventors: Alan Higginson, Tiverton (GB); David Higginson, Sarre (GB); Rachel Aucock, St. Felix de Villadeix (FR); Brete C. Harrison, Sonoma, CA (US)

(73) Assignee: Entyrecycle, LLC, Kenwood, CA (US)

( * ) Notice: Subject to any disclaimer, the term of this patent is extended or adjusted under 35 U.S.C. 154(b) by 190 days.

(21) Appl. No.: 12/628,947

(22) Filed: Dec. 1, 2009

(65) Prior Publication Data

US 2010/0147980 A1 Jun. 17, 2010

Related U.S. Application Data

(63) Continuation-in-part of application No. 12/476,211, filed on Jun. 1, 2009.

(60) Provisional application No. 61/058,122, filed on Jun. 2, 2008.

(51) Int. Cl.
*B02C 19/00* (2006.01)

(52) U.S. Cl. ............... 241/24.14; 241/24.17; 241/24.27; 241/DIG. 31

(58) Field of Classification Search ............ 241/23, 241/24.17, 24.18, 24.27, 24.14, 65, 79, 79.1, 241/DIG. 31
See application file for complete search history.

(56) References Cited

U.S. PATENT DOCUMENTS

| | | | |
|---|---|---|---|
| 4,240,587 A | 12/1980 | Letsch | |
| 5,157,176 A | 10/1992 | Munger | |
| 5,236,992 A | 8/1993 | Bush | |
| 5,375,775 A | 12/1994 | Keller et al. | |
| 5,588,600 A | 12/1996 | Perfido et al. | |
| 5,634,599 A | 6/1997 | Khais et al. | |
| 5,883,139 A | 3/1999 | Wideman et al. | |
| 6,062,283 A * | 5/2000 | Watanabe et al. | ............. 152/510 |
| 6,407,180 B1 | 6/2002 | Wideman et al. | |
| 6,752,940 B2 | 6/2004 | Kao | |
| 6,871,583 B2 * | 3/2005 | Devlin et al. | ..................... 100/6 |
| 2009/0294562 A1 | 12/2009 | Higginson et al. | |

FOREIGN PATENT DOCUMENTS

| | | |
|---|---|---|
| JP | 2002-86449 A | 3/2002 |
| KR | 10-0318095 B1 | 12/2001 |
| WO | WO 02/32637 A1 | 4/2002 |

OTHER PUBLICATIONS

CalRecovery, Inc. Contractor's Report to the Board: Evaluation of Waste Tire Devulcanization Technologies, Dec. 2004 (99 pages).
International search report dated Jan. 14, 2010 for PCT Application No. US2009/45875.

* cited by examiner

*Primary Examiner* — Mark Rosenbaum
(74) *Attorney, Agent, or Firm* — Wilson Sonsini Goodrich & Rosati

(57) ABSTRACT

The invention provides for methods, systems, and devices for processing rubber materials including rubber from tires, tubes, shoe soles, or any other rubber containing product. Characteristics of the rubber materials, such as chemical composition and/or product manufacturer, model, and manufacture date, can be identified. Identification can be performed by personnel, can be automated, or can be a combination thereof. The characteristics of the rubber material can be used to sort the rubber product. Rubber materials suitable for a particular end product can be selected for further processing, which can include size reduction, material separation, chemical and physical processes, devulcanization, or a combination thereof. Processed rubber materials can be stored or delivered to a user or manufacturing site with product specifications.

12 Claims, 6 Drawing Sheets

REDUNDANT TIRE AND RUBBER COMPOUND REPROCESSING

CROSS-REFERENCE

This application is a continuation-in-part application of U.S. patent application Ser. No. 12/476,211 filed on Jun. 1, 2009, which claims the benefit of priority to U.S. Provisional Patent Application Ser. No. 61/058,122 filed on Jun. 2, 2008, which are incorporated by reference herein in their entirety, and to which applications we claim priority.

BACKGROUND OF THE INVENTION

Automotive tires and other rubber products are often difficult to dispose. Further, many recycling procedures have been proposed or are in use to handle these rubber materials. However, most of these procedures provide an end product that is lower in quality than the original rubber material. As such, much of the recycled rubber is used for alternative uses, such as playground floors, running tracks, and various padding or rubber structures or devices.

It would be a significant advance in the art if a recycling process for waste rubber, such as old automotive tires, provided an end product having a defined composition and capable of being used to manufacture new products demanding very good rubber quality. For example, it is desirable in the art to develop a process that can recycle used automotive tires for the partial manufacture of new automotive tires. The objective of delivering high quality rubber end products from recycled rubber has proven difficult, however, the processes described herein provide a novel approach to manufacturing high quality products from recycled rubber.

SUMMARY OF THE INVENTION

The invention provides for methods, systems, and devices for processing rubber materials including rubber from tires, tubes, shoe soles, or any other rubber containing product. Characteristics of the rubber materials, such as chemical composition and/or product manufacturer, model, and manufacture date, can be identified. Identification can be performed by personnel, can be automated, or can be a combination thereof. The characteristics of the rubber material can be used to sort the rubber product. Rubber materials suitable for a particular end product can be selected for further processing, which can include size reduction, material separation, chemical and physical processes, devulcanization, or a combination thereof. Processed rubber materials can be stored or delivered to a user or manufacturing site with product specifications.

The personnel for identifying the input materials and/or overseeing the process can be trained to follow regulatory standards and/or any other standards. The personnel can be trained to identify the composition of the input material using any of a number of analytical techniques. The analytical techniques can be any analytical technique known to one skilled in the art.

The rubber materials can be processed such that contaminants, toxic materials, metal, or any other undesirable material is removed. The rubber materials can be processed such that the processed rubber product can be used in a selected process or for a selected product. In some embodiments of the invention, the rubber is processed such that the product will meet selected specifications. These specifications can include size, composition, mechanical properties, or any other characteristic described herein.

Equipment used to process the rubber materials can include rotary shears, conveyors, troughed out feed conveyors, dividing chutes, dividing conveyors, pre-shredders, magnetic tables, granulators, overband magnets, elevating conveyors, zig zags, cyclones, grids, and meshes. Other equipment used to process the rubber materials, described herein or known to one skilled in the art, can be used to process rubber materials.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
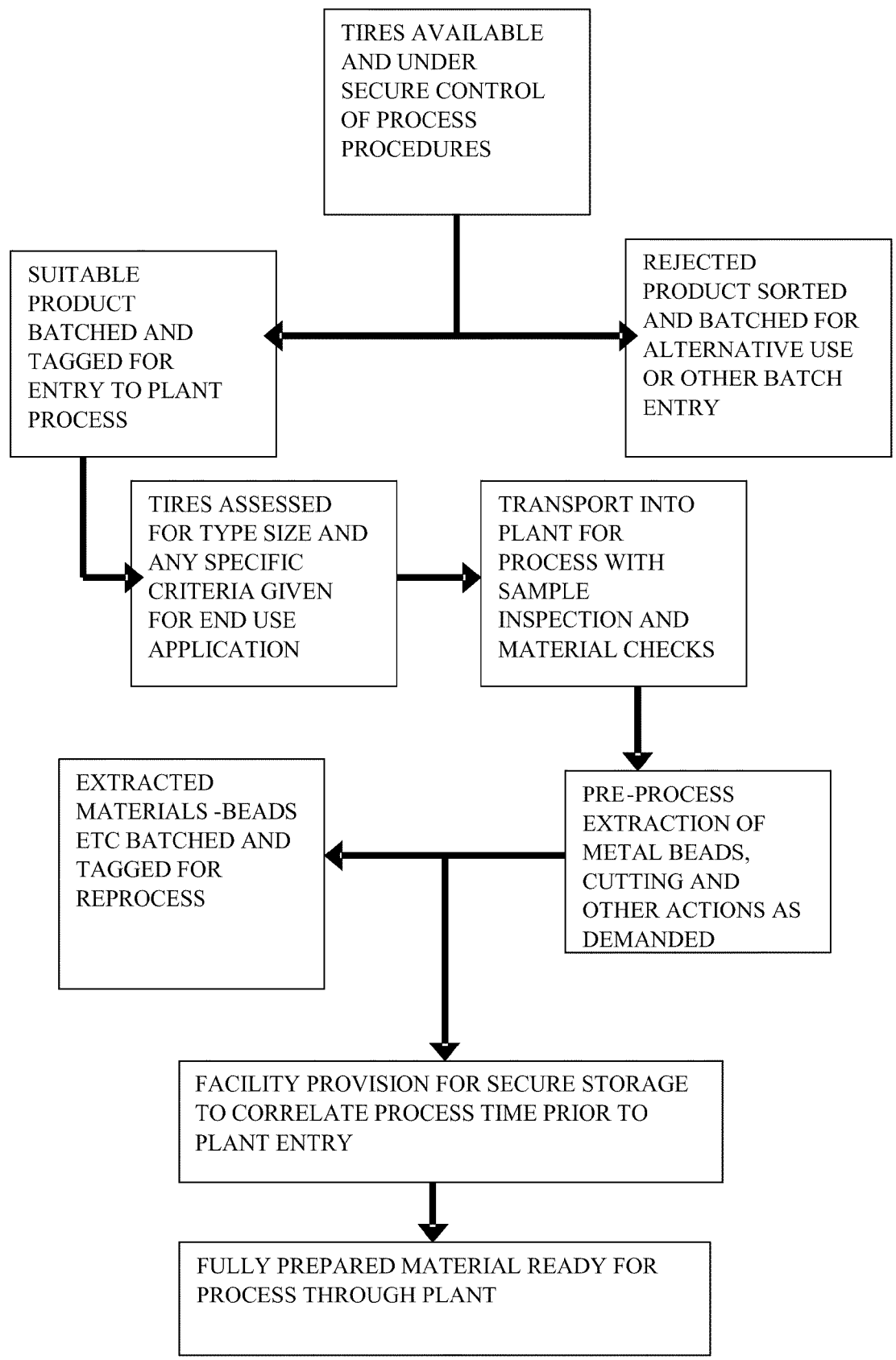
FIG. 1 demonstrates assessment and selection procedures for manufacturing new products from recycled rubber.

Methods and processes are described herein that are useful in generating objects from redundant or recycled rubber, such as material to be substituted for new rubber and/or used rubber in the manufacture of tires. In an aspect, a process comprises: assessing redundant tires and/or waste rubber materials according to a compound formulae of the waste materials; and selecting materials to be separated from the waste materials, wherein the material is selected for the manufacture of an object; and separating the selected tires and/or waste rubber materials, wherein said separation is for processing the separated material for the particular end uses predetermined for the specific qualities of the selected redundant tires. This process may be undertaken in a novel way using electronic identification systems that select the tire in accordance with its known composition.

The processes and systems described herein may require significantly less energy, such as heat energy, cooling, and the addition of chemicals to generate a recycled rubber material than current methods of rubber recycling. In an embodiment, the processes and systems can reduce a carbon footprint and improve the sustainability of a rubber recycling method.

In an embodiment, after the waste materials have been assessed, selected and separated, two types of waste materials or more may be mixed to achieve an end product formula according to an end user. In a further embodiment, the mixing can be monitored within the controls incorporated within the process to regulate and manage the end product production.

Personnel

In an embodiment, persons carrying out the duties of assessment and selection must have completed bespoke training courses that qualifies the operatives to be fully aware of the methods and process of selection. These training courses may be internationally recognized. The persons may also be aware of the adverse consequences of non compliance with laid down selection procedures. Additional process security can be carried out by inspectors exercising continuous audit of the selection procedures through sample inspections.

The assessment and selection process may be carried out in any approved and endorsed work suitable location so long as the selected products cannot then be interfered with prior to processing the products or materials carried out in the controlled environment within the process plant. In an embodiment, the suitable location is approved by a person with training in a process of the invention.

In an embodiment, a properly trained person performs the assessment and selection functions for quality control of the selection of the redundant materials. In another embodiment, the functions are performed by computer system based on criteria or input from or associated with the product itself. The process may have ISO process adherence. Personnel for performing functions described herein or for controlling a computer system for performing the functions can be trained, tested, and repeatedly examined to assure high quality control of the process that can often be important to many of the processes described herein. Personnel can also be provided consistent updates based on product details or changes in products.

In an exemplary embodiment, personnel for carrying out a process or selection process of the invention are trained to assess the redundant, recycled, or waste material based on a plurality of characteristics of the material. For example, the characteristics can include, but are not limited to, material type (for example, make and size), extraction of metal, wire or fiber from the material, process size, shape and granule type for a specific end application of the processed material, mixes of different characteristic process materials for an end application, and process volume and weight. After the initial assessment, all processes necessary to generate a new product or end application can be monitored by personnel or a computer system for the date and time of the process, the volume of the processed material, or any other item that may be desired regarding the characteristics of the final processed material for use in an end application.

The necessary processes may be determined by personnel and/or an automated system based on the desired end applications or products. For example, given a waste rubber material, trained personnel may determine performance characteristics for processing equipment. The processing equipment may be variable and programmable. For example, the speed of operation, speed of rotation, speed of conveyance, time, temperatures, strength, amount of power, treatment chemicals, and/or any other performance characteristic of an item of processing equipment may be varied (e.g., increased/decreased) and/or maintained to yield the desired end application or products. Processing equipment may include any of the devices and/or apparatuses described herein, including but not limited to rotary shears, conveyors, troughed out feed conveyors, dividing chutes, dividing conveyors, preshredders, magnetic tables, granulators, overband magnets, elevating conveyors, zig zags, cyclones, grids, and meshes. In some alternate embodiments, an automated system, such as a computer system, may determine performance characteristics for one or more processing equipment based on the waste rubber materials received and/or the desired characteristics for the end product.

In some embodiments, personnel may be provided with and/or interacting with a set of controls that may enable the personnel to perform the assessment or selection functions and/or carry out any of the steps described herein. The controls may be provided as any user interactive interface including but not limited to a computer interface, one or more screens, buttons, knobs, switches, levers, or any other set of interfacing devices. A user interactive interface may be configured to receive input from trained personnel. Such input may include but is not limited to input relating to sorting, material characteristics, material identification, identification or characteristics of desired end products, or processing equipment performance characteristics.

Input Materials and Identification

From the time that the redundant tire and rubber compound materials come into the control of the process regulations, the selected batches and the material that proves not fit for process can be identified with traceable tags or other devices that move with the batches through the process system until the end product is packed ready for use or shipment. In an embodiment, all of the end products carry clear and concise traceability tags with the constituent make-up formulae labels to describe the content. For example, the end products may be bar coded, RFID-tagged, or have other electronically identifiable devices. The tags may identify the batch and/or materials and said identifiers may be cross-referenced or provide access to a database or any other set of records that may have additional information about the materials. Such additional information may include information about material characteristics, age, features, intended end product, characteristics of an intended end product, and/or equipment performance parameters. Alternatively, the tags themselves may contain information about the batch and/or materials, which may or may not include the additional information discussed herein.

As a result of a recycling process providing a clear definition of the end product composition, the end products may be recycled again and repeatedly. For example, tracked recycled materials can be known and understood for the end use applications for which the materials are suited, which may also avoid or minimize material failure and health and safety issues. In another example, a process may require the identification of the composition of every tire manufactured for recycling to more easily and accurately control. A rubber material can be composed of a variety of components, including isoprene, sulfur, ebonite, 3-methylisoprene (2,3-dimethyl-1,3-butadiene), thiokol, divinylacetylene, neoprene, isobutylene (2-methylpropene), styrene butadiene rubber (SBR), acrylonitrile-butadiene rubber (NBR), cis-1,2-polyisoprene, cis-1,4-polybutadiene, polyurethane, ethylene-propylene terpolymer rubber (EPDM), metal, steel, pigment, and carbon black. Additional components can be found in U.S. Pat. Nos. 4,240,587, 5,157,176, 5,236,992, 5,375,775, 5,634,599, 5,883,139, 6,407,180, and 6,752,940, each of which are incorporated herein by reference in their entirety. Table I lists a variety of components that can be identified in various rubber compositions. Table II lists a variety of components that can be identified in redundant tires used for trucks and passenger cars in the European Union and Tire rubber from Canada. Approximately 80% of the weight of car tires and 75% of truck tires can be rubber compound. In some instances, the compositions of tires produced by different manufacturers can be similar or dissimilar. Tires can contain approximately 1.5% by weight of hazardous waste compounds, as shown in Table III. These compounds can be encased in the rubber compound or present as an alloying element. Any of these components can be identified by personnel or by automated processes and used to identify a rubber material to be processed, to identify a selected end product, used to separate the rubber material during processing, or used as a criteria for separation of the rubber material during processing.

TABLE I

| Composition A: SBR Rubber | Composition B: EPDM Rubber | Composition C: SBR Rubber |
|---|---|---|
| SBR | EPDM | SBR 1712 |
| N-330 Carbon Black | N-330 Carbon Black | CIS-1,4 BR |
| Sundex 790 | Plasticizing Agent | Carbon Black |
| Plasticizing Agent | Flexon 766 | Oil (Sundex 790) |
| Zinc Oxide | Zinc Oxide | Zinc Oxide |
| Stearic Oxide | Stearic Oxide | Sunproof Improved Stabilizer |
| Antioxidant | Antioxidant | Wingstay 100 |
| Santocure | Santocure | Stearic Acid |
| TMTD | TMTD | N-cyclohexyl-2-benzothiazolesulfenamide |
| Sulfur | Sulfur | 2-mercaptobenzothiazole |
|  |  | Sulfur |

TABLE II

| Material | Car Tires (EU) | Truck Tires (EU) | Tire Rubber (Canada) |
|---|---|---|---|
| Rubber/elastomers | 47% | 45% | 62% |
| Carbon black | 21.5% | 22% | 31% |
| Metal | 16.5% | 25% | NA |
| Fibre | 5.5% | — | NA |
| Zinc oxide | 1% | 2% | 2% |
| Sulfur | 1% | 1% | 1% |
| Additives | 7.5% | 5% | 4% |

TABLE III

| Chemical Name | Remarks | Content |
|---|---|---|
| Copper compounds | Alloying constituent of metallic reinforcing material | Approximately 0.02% |
| Zinc compounds | Zinc oxide, retained in the rubber matrix | Approximately 1% |
| Cadmium | On trace levels, as cadmium compounds attendant substance of the zinc oxide | Maximum 0.001% |
| Lead or Lead compounds | On trace levels, as attendant substance of the zinc oxide | Maximum 0.005% |
| Acidic solutions or acids in solid form | Stearic acid, in solid form | Approximately 0.3% |
| Organohalogen compounds | Halogen butyl rubber (tendency: decreasing) | Maximum 0.1% |

Rubber materials that can also be sorted based on characteristics of how the rubber material was manufactured or the type of environment the rubber material has been exposed to. For example, a heat-cured rubber material may be sorted into a different group as a rubber material that was not heat-cured. As another example, a tire that has been exposed to high temperature fluctuations and/or UV exposure, such as in a desert, may be sorted differently from a tire that has been exposed to a temperate climate and/or low UV exposure. Alternatively, a rubber material can be sorted based on its content of or exposure to toxic or hazardous materials, such as toxic radioactive materials, toxic chemicals, or hazardous waste compounds.

In an embodiment, an assessment process technique is based upon visual examination of a rubber material, such as a tire or other materials, for selection and batching, be it using the human eye or other electronic system that recognizes the characteristic of the tire. For example, visual examination of a rubber material provide for information regarding the manufacturer, manufacture date, or product model. Visual examination can provide for a simplified method for sorting rubber products that have similar or substantially the same composition. Further analysis can be performed to identify the components of these materials that are identified as having similar or substantially the same composition. In some embodiments of the invention, visual examination is not required to identify the manufacturer, manufacture date, or product model. This information can be obtained through other methods, systems, and devices, including automated recognition, described herein. Knowledge of the manufacturer, manufacture date, and/or product model may be used to determine the composition, age, and/or other characteristics of the rubber products. Such information may be compared to and/or cross-referenced with other data in making said determination.

In another embodiment, a process described herein can lead to electronic or automated recognition of different batches or end products. In some embodiments of the invention, automated systems utilizing optical, magnetic-based, and/or mechanical analysis can be used to characterize a rubber material. For example, a rubber material can be examined using a spectrophotometric method that identifies one or more components of the rubber material. Alternatively, a digital image of the rubber material is obtained and processed to determine the manufacturer or information regarding the rubber material.

FIG. 1 demonstrates assessment and selection procedures for manufacturing new products from recycled rubber. For example, old or used tires can be made available to the selection procedures under a quality control system. For example, the control system can be manual control by trained professionals, or the control system can be automated and under computer control. In an embodiment, a tire can be electronically tagged or marked by an RFID, and then read by a computer system for entrance in a selection procedure of the invention. After the suitable redundant rubber is identified by a system (for example, trained personnel), it is batched and tagged for entry in a plant process, such as the plant process described herein. FIG. 1 also demonstrates a step of further assessing the rubber material in the selection procedures by type, size, or any other criteria relied upon as determined by the end use application. For example, the criteria may be different for redundant rubber that will be used in part to manufacture a new tire as compared to redundant rubber that will be used at a playground. In an embodiment, a recycled rubber end product of a process of the invention can be used to manufacture low-speed tires, such as fork-lift or bicycle tires. In another embodiment, a recycled rubber end product can be used as a source, in part, for the manufacture of high-speed tires, such as automobile tires.

Material Sorting and Separation

FIG. 1 also demonstrates an exemplary process of transporting selected materials into the plant for sample inspection. For example, a person trained for inspecting the proper quality materials for an end use performs the sample inspection. In an embodiment, a machine programmed to identify material based on criteria provided from a user performs the sample inspection. As shown in FIG. 1, after a material has been selected to be processed, a preprocess procedure can be carried out. For example, preprocess procedures include extraction of metal beads, cutting of redundant rubber material, or other actions that may be demanded by a certain end application, as would be obvious to one skilled in the art. After the material is selected, and in an embodiment, prepared, it is processed through a plant, for example, as described herein below. Material that has not been selected can also be sorted and/or batched for alternative uses, or for preparation for an end application with different criteria. In another embodiment illustrated in FIG. 1, material extracted from the selected material, such as beads or metals, can be marked, sorted, and/or batched for other industrial processes. A facility for selecting a material can include a provision for storage as illustrated in FIG. 1. In an embodiment, the storage can correlate to time that is taken to transfer material prior to plant entry. For example, when the plant has to be decontaminated and cleaned of a previous batch throughput before a new material batch enters for process, material can be held in a secure storage area where risks of mixing with other materials can be minimized by compliance with procedures.

Material Size Reduction

An example rubber granule preparation plant is designed to process in excess of 4 tons of infeed tire of various defined quality compound per hour, including Auto, Commercial, and Truck tires to Super Singles Size 15" to 16" wide and further cut sizes can be dimensioned to be accommodated by the equipment for the process. The rubber granule preparation plant may be designed to process any amount of infeed tires, including but not limited to amounts in excess of 1 ton, 2 tons, 3 tons, 4 tons, 5 tons, 6 tons, 8 tons, 10 tons, 12 tons, 15 tons, 20 tons, 25 tons, 30 tons, 50 tons or more, and/or up to 1 ton, 2 tons, 3 tons, 4 tons, 5 tons, 6 tons, 8 tons, 10 tons, 12 tons, 15 tons, 20 tons, 25 tons, 30 tons, 50 tons or less. A finished product size can be dependent upon final granulation grid hole diameter based upon a sizing table; for example, a supplied basic finished product granules are about ⅘ mm. In some embodiments of the invention, the finished product granules are up to about, greater than about, or about 0.01, 0.1, 0.5, 0.8, 1, 2, 4, 5, 10, 20, or 50 mm in size. The finished product can have a size that is between about 0.5 to 10 mm, 1 to 7 mm, 3 to 6 mm, or 4 to 5 mm.

During a process described herein for producing a redundant rubber product, waste or used rubber can be fed into a system or device for tearing, shearing, or shredding the waste material. In an exemplary embodiment, tires are fed into a rotary shear hopper. Other types of devices for shredding redundant or recycled rubber may vary to achieve size shape and density for process requirements because the granulate or powder products are designed for an end use application.

In an example, the rotary shear consists of two slow speed contra rotating shafts fitted with hook type knives interspaced with protective discs. Individual hydraulic motors, each fitted with a reduction gearbox, can drive the shafts. All bearings are oil filled and the machine and cases are sealed to avoid ingress of deleterious liquids. The hydraulic motors are provided with hydraulic oil from a separate self-contained power pack, complete with oil cooler and electrical controls. The unit is mounted on a self-supporting steel structure complete with in-feed hopper and discharge chute.

After the processed material leaves system or device for tearing, shearing, or shredding the waste material, the processed material can be discharged by means of a conveyor. In an example, the conveyor is a rubber chevron belt conveyor. The conveyor can be any conveyor or system as would be obvious to one skilled in the art to move processed material from one part of the process to the next. Alternatively, any processed material may be moved manually.

In an embodiment, at the head of the conveyor, processed material is divided and directed onto two conveyors that carry the processed material onto at least one preshredder. A first stage preshredder can be fitted with grids having a hole size of about 50 mm in diameter, and the rotor of the preshredder may run at a known and predetermined speed which may materially affect the quality of the end products. In some embodiments, the rotor of the pre shredder may be running at a rate falling within 10-300 rpm, 50-200 rpm, 90-150 rpm, or at about 10 rpm, 30 rpm, 50 rpm, 80 rpm, 90 rpm, 100 rpm, 120 rpm, 140 rpm, 150 rpm, 170 rpm, 180 rpm, 190 rpm, 200 rpm, 210 rpm, 220 rpm, 230 rpm, 250 rpm, 270 rpm, 290 rpm, 300 rpm, 350 rpm, or at any other speed. The predetermined speed may depend on the material being shredded and/or desired characteristics of the end product. The preshredder rotor speed may affect the shape of the resulting shredded material. In some embodiments, a slower rotation may provide more torque which can cope with a choked feed. This may improve the shape of the product. The feed speed and the rotational speed, together with the amount of feedstock may determine the characteristics of the finished product. In some embodiments, a more cubic finished product may be preferable. In other embodiments of the invention, the grids can have a hole size of up to about, greater than about, or about 10, 20, 50, 75, 100, or 150 mm in diameter. The preshredder may also be run at up to about, about, or greater than about 50, 150, 200, 250, 300, or 350 rpm.

The materials upstream of the preshredder may be continually monitored to ensure that both feeding and processing are matched. The feeding and processing speeds may be coordinated to produce desired characteristics (e.g., compositions, shapes) of an end product.

In an embodiment, a preshredder comprises a rotator with knives in a chevron formation rotating on a steel body. In the exemplary embodiment, the body can be fitted with two rows of static adjustable knives and, in high wear areas, with a wear resistance liner. In another embodiment, the first stage preshredder is fitted with a grid having a hole size of about 10-500 mm in diameter. The grid can also have a hole size that is up to about, about, or greater than about 1, 5, 10, 50, 75, 100, 200, 300, 400, 500, 750, or 1000 mm in diameter. The hole size can be between about 1 to 1000, 5 to 750, 10 to 500, 20 to 250, or 40 to 125 mm. A grid can be easily removable, such as with a hydraulic lowering device. In yet another embodiment, a rotor of the preshredder can run at a known and predetermined speed. In some examples, this known and predetermined speed may fall between about 10-1000, 20-750, or 50-400 rpm, or may have any other speed. Material is discharged from the grid at the bottom of the machine and can be carried away by a vibrating conveyor. The vibrating conveyor is often composed of metal and therefore, can accommodate any heated steel components that may be present in the processed material without damage to a system of the invention. The vibrating conveyor can also create a proportionate reduction in fire risk. In another embodiment, a mist spraying system is fitted to the preshredder to reduce friction, thereby improving cutting and reducing fire risk. In this example, the water flow can be controlled to obviate wet finished product and filtration can be used to control dust emission.

In an embodiment, shredded material discharged from the first stage preshredder along the vibrating conveyor can be elevated by means of a conveyor to a second stage preshredder with a grid size having holes of a smaller diameter than the grid fitted on the first stage preshredder. For example, a grid fitted on a second stage preshredder can have holes 10-500 mm in diameter. The grid can also have a hole size that is up to about, about, or greater than about 1, 5, 10, 50, 75, 100, 200, 300, 400, 500, 750, or 1000 mm in diameter. The hole size can be between about 1 to 1000, 5 to 750, 10 to 500, 20 to 250, or 40 to 125 mm. In yet another embodiment, a rotor of the second stage preshredder can run at a known and predetermined speed. In some instances, the known and predetermined speed may fall between about 10-1000, 20-750, or 50-400 rpm, or at any other speed.

The second stage preshredder can consist of a higher speed-rotating shaft fitted with knives. The second stage preshredder can produce material of less than about, about, or greater than about 0.5, 1, 5, 10, 20, 30, 50, 75, 100 or 150 mm in size. After shredding the processed material in the second stage preshredder, the material can exit the preshredder and onto another conveyor. In an embodiment, material exits the second stage preshredder onto a metal belt-shaking conveyor. A spraying system can be fitted to the shredder to reduce friction, improving cutting and reducing fire risk. In a further embodiment, water flow is controlled to obviate wet finished product.

The processed material after traveling through at least one preshredder can then be fed onto a conveyor. Preferably, the processed material is a granule of about 1000-1, 500-5, or 100-10 mm diameter or less. In an embodiment, the conveyor is a rubber belt conveyor fitted with eccentric rollers beneath the belt to agitate the material and thus maximize steel removal by means of a magnetic table. The processed material granules can then be transferred to another conveyor, for example, a rubber belt-elevating conveyor. In an embodiment, the magnetic table is an overband magnetic unit suspended from a steel frame above the conveyor to remove any steel material from the processed rubber material.

Magnetic Separation

After shredding, the processed material can be delivered to a storage hopper that controls the feed rate onto a further conveyor. In an embodiment, the conveyor is a chevroned, rubber belt, elevating conveyor. In an embodiment, the storage hopper is a fabricated steel structure that is flexibly mounted to reduce wear. The storage hopper can include an adjustable gate to control the flow of material.

The processed material can then be fed to a granulator section that comprises initially of a recovery granulator fitted with grids having about 12 mm diameter holes. The holes can also be less than about, about, or greater than about 1, 2, 4, 6, 8, 10, 15, 20, 25, 50, 75, or 100 mm in diameter. The granulator section typically comprises an in-feed hopper and under grid vibrating conveyor to remove the granulated rubber. An overband magnet is mounted over the vibrating tray to remove steel particles. The rubber granules fall from the end of the vibrator directly into the bucket elevator. Filtration takes place in the same manner as on the preshredders.

In an embodiment, the processed material after the granulator section is about 95% metal-free. In another embodiment, the processed material is about 99% metal-free. In yet another embodiment, the processed material contains no metal material. In an embodiment, the processed material after the granulator section is about 95% free of magnetic material. In another embodiment, the processed material is about 99% free of magnetic material. In yet another embodiment, the processed material contains no metal material. In an embodiment, the processed material after the granulator section is about 95% steel-free. In another embodiment, the processed material is about 99% steel-free. In yet another embodiment, the processed material contains no steel material. The percent that the processed material is free of a given type of material can be determined on a mass basis, volume basis, or a combination thereof.

Additional Processing

In an embodiment, the bucket elevator conveyor elevates material and discharges it into the top of a zigzag system, which is via a rotary valve system. The zigzag conveyor allows any heavy material, such as rocks or metal valves, to be discharged from the bottom. A further processed material can be drawn from the top by means of a pneumatic conveyor system into a cyclone which may be unique in that the velocity and quantity of air flow can be adjusted remotely, which may materially affect the quality of the finished product, where it is discharged into a screw-elevating conveyor, which feeds the final system. The airflow velocity may fall within the range of 5 m/s to 300 m/s, 15 m/s to 200 m/s, or about 22 m/s to 100 m/s. The airflow velocity may have any value, which may include those of 2 m/s, 5 m/s, 10 m/s, 15 m/s, 20 m/s, 22 m/s, 25 m/s, 30 m/s, 40 m/s, 50 m/s, 70 m/s. 90 m/s, 100 m/s, 120 m/s, 150 m/s, 200 m/s, 250 m/s, 300 m/s, 500 m/s or greater or lower. The airflow velocity may depend on the material being processed.

The second stage granulator is a similar machine to the previous granulator, but can be fitted with a grid having about a 5 mm diameter hole size. The grid can have hole sizes that are less than about, about, or greater than about 0.01, 0.1, 0.5, 1, 2, 4, 7.5, 10, 15, or 20 mm in diameter. The second stage granulator can be filtered as the first stage. Material from the granulator, after removal by the metal vibrating conveyor is elevated by means of a screw conveyor and fed to a classifier, wherein any fluff, sterile and light materials is removed by air and transported to the filtering system. The classifier may be innovative in that the input and output speeds can be controlled remotely, and may materially affect the quality of the finished product. The classifier may run in tandem with the cyclones, and the balanced operation of both may provide desired characteristics for the end products. The processed material, now rubber granules, are sized by vibrating trays, and the sized products are elevated by screw conveyors feeding permanent rotary magnets to remove any remaining steel. The final rubber products will be passed to the storage system by elevating screw conveyors.

In some embodiments of the invention, a rubber material can be subjected to devulcanization. Devulcanization can include any devulcanization method known to one skilled in the art, including methods that involve chemical or physical processing, or methods described in "Evaluation of Waste Tire Devulcanization Technologies", CalRecovery Inc., California Integrated Waste Management Publication, December 2004, incorporated herein by reference in its entirety. For example, a devulcanization process can include pyrolyzing the rubber, subjecting the rubber to cryogenic conditions, or subjecting the rubber to ultrasonic waves or microwaves.

Product Packaging

In some embodiments of the invention, the processed rubber is packaged for delivery to a user. The processed or recycled rubber can be accompanied by a product specification or specification sheet that includes information regarding one or more of the following: particle size, composition, metal content, mechanical properties, source material, source material composition, and source material mechanical properties. The packaged products may or may not be identified with traceable tags or other devices. In some instances, information that was associated with and/or stored in traceable tags may be used in formulating the product specification. The products can be standardized in accordance with any regulatory guidelines, including ISO standards. Packaged products can be inspected for quality control to ensure product quality and/or composition.

Controls

Figure 2:
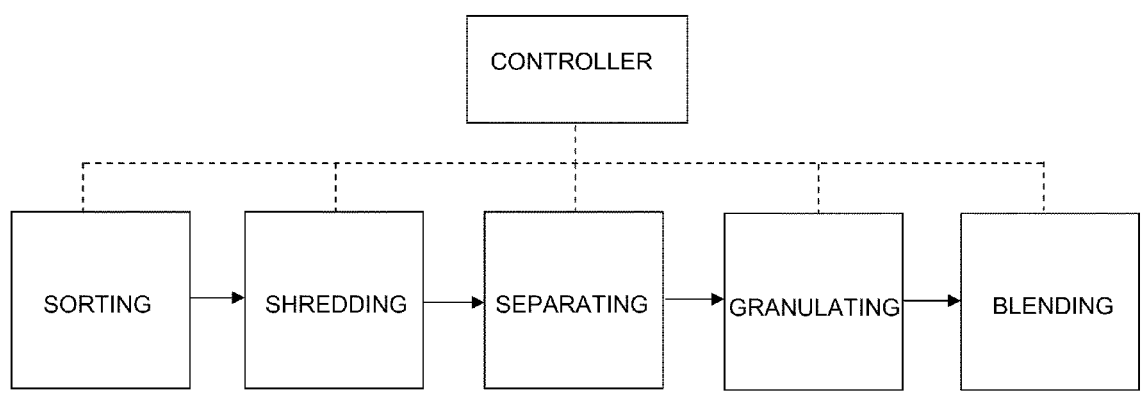
FIG. 2 illustrates a high-level depiction of a controlled processing system in accordance with an embodiment of the invention.
Figure 3A:
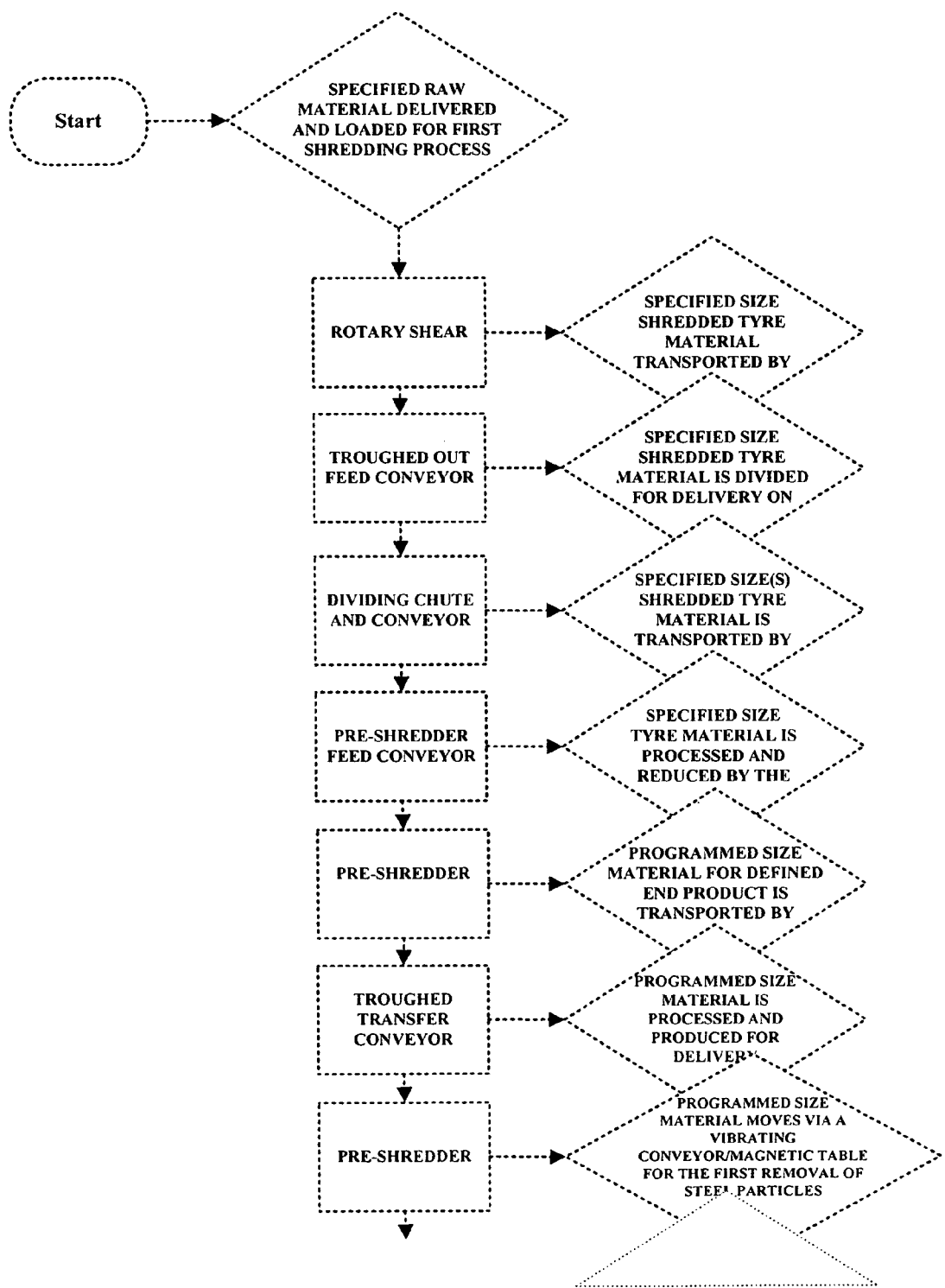
FIGS. 3A, 3B, 3C, and 3D demonstrate an exemplary system wherein after raw material, such as waste or redundant rubber, is selected by a process of the invention carried out by trained personnel, the specified raw material is delivered and loaded for a first shredding process. The bottom of FIG. 3A continues at the top of FIG. 3B. The bottom of FIG. 3B continues at the top of FIG. 3C. The bottom of FIG. 3C continues at the top of FIG. 3D.
Figure 3B:
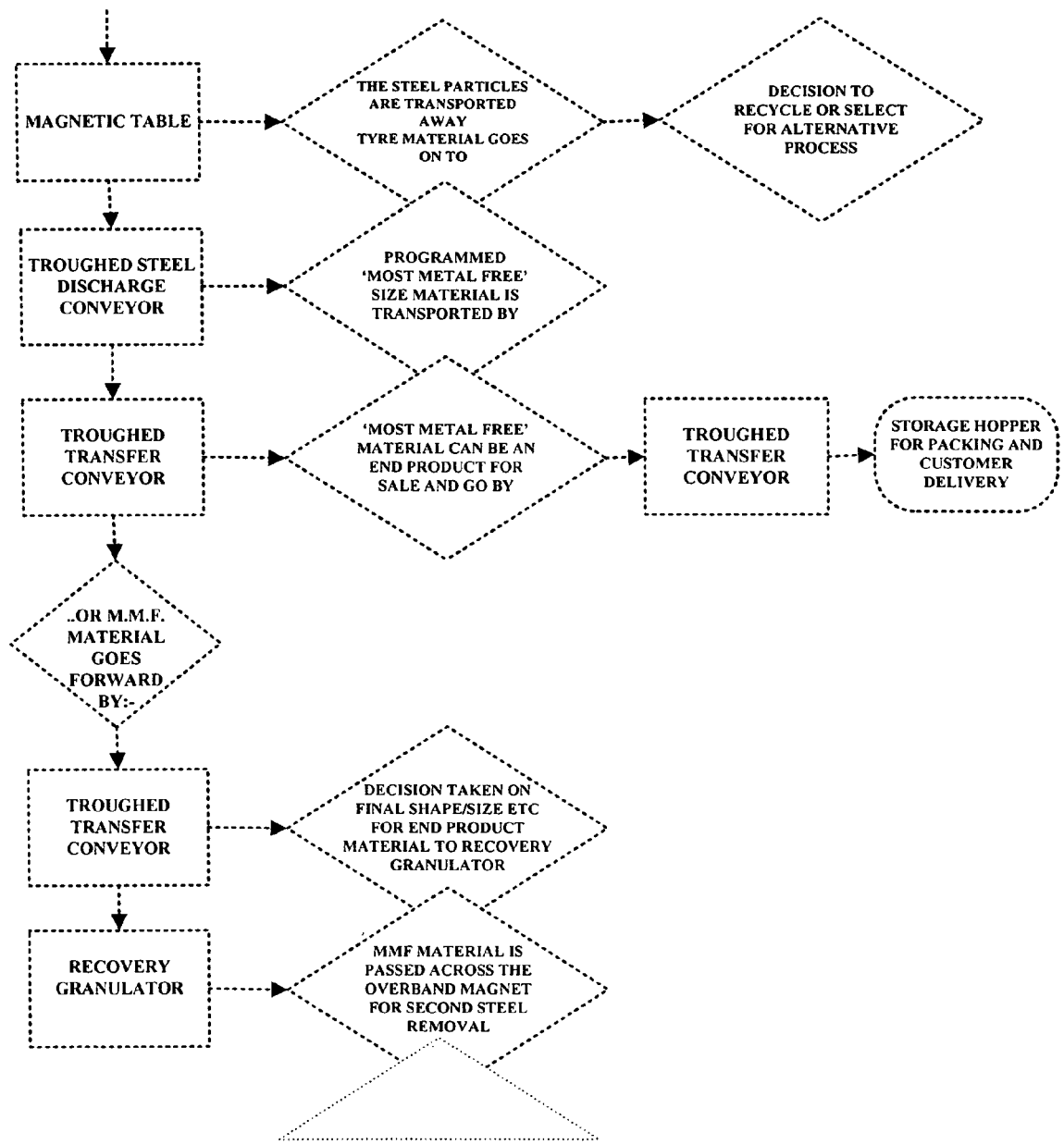
Figure 3C:
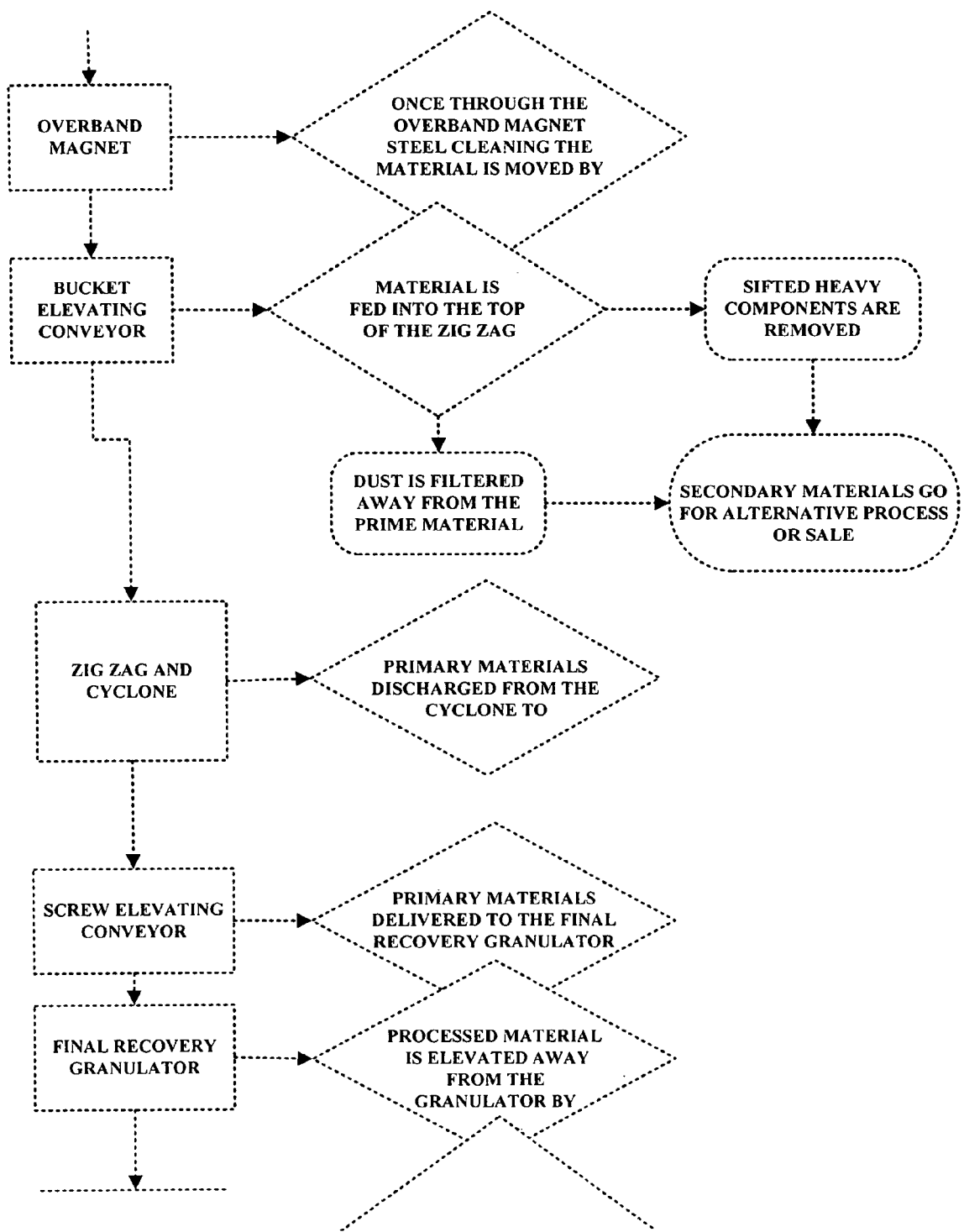
Figure 3D:
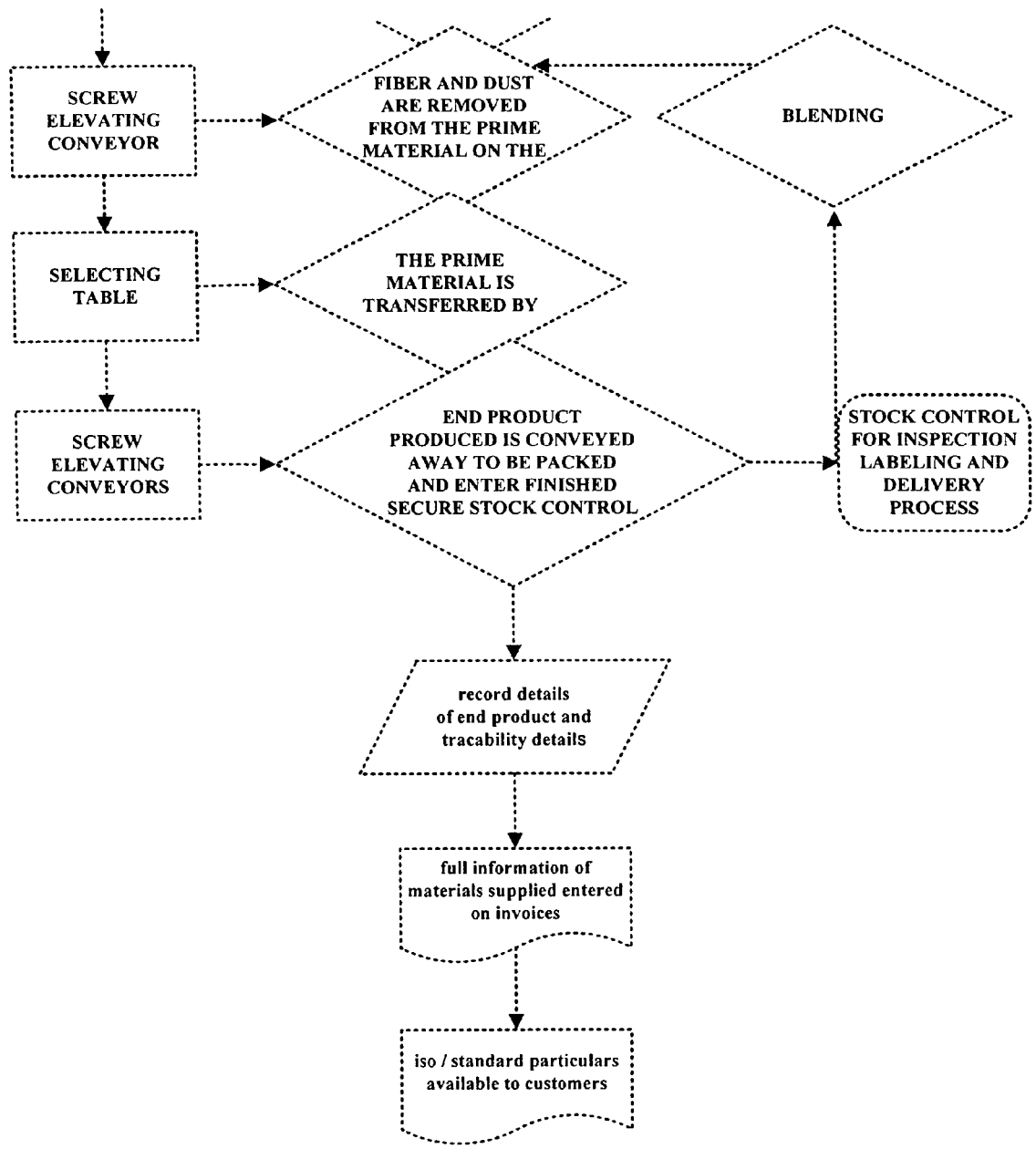

FIG. 2 illustrates a high-level depiction of a controlled processing system in accordance with an embodiment of the invention. The system may include a processing arrangement that may include or more processing equipment. The processing arrangement may include sorting equipment, shredding equipment, separating equipment, granulating equipment, and blending equipment that may correspond to one or more sorting step, shredding step, separating step, granulating step, and blending step in a process for recycling rubber. A controller may be in communication with one or more processing equipment of the processing arrangement. The processing equipment may be variable and programmable.

In one example, a controller may be configured to communicate with at least one of the following: sorting equipment, shredding equipment, separating equipment, granulating equipment, and blending equipment. In some instances, the controller may communicate with one, two, three, more, or all of the aforementioned types of equipment. The controller may send one or more signal to the associated equipment, thereby affecting an operating parameter of the associated equipment. For instance, the controller may control the speed of a preshredder rotor. In another example, the controller may control the speed of a conveyor. In yet another example, the controller may control the airflow speed in a cyclone. The controller may control any operating parameter within a processing arrangement, which may include but is not limited to: speed of operation, speed of rotation, speed of conveyance, time, temperatures, strength, treatment chemicals, and/or any other operating parameter.

In some embodiments, the controller may also receive communications from the associated equipment. For example, feedback configurations may be provided where a controller may receive information from the associated equipment and adjust the performance of the associated equipment accordingly.

The controller may communicate with the associated equipment via electrical signals. In some instances, the controller may communicate with the associated equipment via wired or wireless communications.

In some embodiments, the controller may be provided at a control center. The control center may preferably be onsite with the rest of the processing arrangement. In other embodiments, the control center may be remote to the rest of the processing arrangement. The controller may include one or more computer system and/or microprocessors. The controller may include tangible computer readable media with logic, code, data, instructions, may be used to implement any software, steps, processes or methodology.

The controller may be configured to interface with one or more user. The user may or may not be trained personnel as described elsewhere herein. The controller may receive an input from the user. The input may include but is not limited to input relating to sorting, material characteristics, material identification, identification or characteristics of desired end products, or processing equipment performance characteristics. The input may be received via a user interactive interface. In some instances, the user interactive interface may also display information to the user. In response to the displayed information, the user may or may not choose to provide or adjust an input. In some instances, the controller may operate independently of a user. For example, the process may operate autonomously from a user. The controller may continuously or spot-monitor the operation of the processing equipment. In some instances, only occasional user intervention may occur.

A processing arrangement may include a sorting assembly that may enable an associated sorting step in a process. The sorting assembly may include devices that may allow raw material to be sorted according to raw material characteristics. For example, the raw material may be a waste rubber. The waste rubber may be sorted according to composition. Such equipment that may enable such sorting may include but is not limited to rotary shear, a troughed out feed conveyor, and/or a dividing chute and conveyor. In some embodiments, the sorting equipment may operate similarly to a luggage carousel. The sorting equipment may have a circular, or any other shape.

The raw material may be optically scanned (or may use any other recognition technique) to identify the raw material. For example, an optical scanner may receive an image of a rubber tire, and employ algorithms to visually analyze the tire to determine a manufacturer, model number, or any other identification information for the tire. In some instances, the model or other identifying number may be visible on the tire image, and may be determined using the optical scanning system. In other instances, the images may be viewed by personnel to identify the tire. In other embodiments, physical features of the tire, such as the size, tread, shape, magnetic properties, material properties, weight, may be analyzed to identify the tire. Alternatively, the tires may be pre-sorted or pre-tagged with a tire identifier. Any other sensors may be utilized to assist with identifying the tire. In some embodiments, the controller may be communicating with the scanner, sensors, or other identification means.

Based on the tire identification (or identification of any other rubber product), one or more database or set of records may be accessed. A database may include additional information relating to an identified tire (or other rubber product). Such additional information may include (but is not limited to) material composition, metal content, mechanical properties, age, other material properties, and/or information relating to processing equipment operating parameters for a given end product. The additional information may be associated with the rubber product identity. Based on this additional information, the tires/rubber products may be sorted using the sorting equipment, so that materials with the same or similar material properties may be sorted into the same containers and/or processing line. Alternatively, the material need not have the same composition, but may have other desirable characteristics that may allow it to be provided to the same processing line. The controller may keep track of what materials are sorted for which process to yield a desired end product. The controller may also control which materials are sorted into which process.

A processing arrangement may include a shredding assembly that may enable an associated shredding step in a process. The shredding assembly may include devices that may allow sorted material to be shredded to desired size, shape, and/or other characteristics. In some instances, the sorted material may have similar compositions, or fall within a desired composition range. The shredding assembly may include but is not limited to a pre-shredder feed conveyor, a pre-shredder, a troughed transfer conveyor, and another pre-shredder. In some instances, one, two, three, four, or more shredding steps may be employed. Any of the shredding equipment of the shredding assembly may be in communication with the controller. The controller may determine the rotor speed of a pre-shredder and/or the speed of a conveyor. The controller may coordinate and/or control the conveyance speed and/or rotor speed to yield a desired material property (e.g., shape, size) of shredded material. This may affect the desired material property of the end product, down the line.

In some implementations, the processing arrangement may include a separating assembly which may enable an associated separation step in a process. The separation assembly may include one or more devices that may separate out certain materials. In some instances, the separation assembly may remove metals (e.g., steel), or other materials, which may include toxic materials. The separating assembly may include but is not limited to a magnetic table, troughed steel discharge conveyor, troughed transfer conveyor, and/or an overband magnet. Magnets may be used to remove metal components. Other treatments including mechanical separation, or chemical separation may be utilized to separate certain materials. A prime material may continue along the process to the desired end product. The removed material may be stored, disposed of, or used for different processes. The controller may communicate with any of the separating equipment. For example, the controller may control the conveyance speed and/or control the strength of one or more magnet. Such controls may determine how much of the material is separated.

A granulating step may follow a separating step. The processing arrangement may include a granulating assembly which may be associated with the granulating step in the process. The granulating assembly may include one or more devices that may assist with further cutting or granulating the material. This may result in improving the shape of the material. The granulating assembly may include devices such as a troughed transfer conveyor and one or more recovery granulator. The controller may be communicating with any of the granulating equipment in the granulating assembly. The controller may determine the rotor speed of a recovery granulator and/or the speed of a conveyor. The controller may coordinate and/or control the conveyance speed and/or rotor speed to yield a desired material property (e.g., shape, size) of granulated material. This may affect the desired material property of the end product, down the line.

The processing arrangement may include a blending assembly which may be associated with a blending step in the process. The blending assembly may include blending equipment that may further refine the desired material property (e.g., size, shape). The blending assembly may include bucket elevating conveyor, zig zag, cyclone, screw elevating conveyor, and/or selecting table. The controller may be communicating with any of the blending equipment. The controller may determine the air flow speed of a cyclone and/or the speed of a conveyor. The controller may coordinate and/or control the conveyance speed and/or cycle air speed to yield a desired material property (e.g., size, shape) of blended material. This may affect the desired material property of the end product.

In some embodiments, throughout the process, the controller may keep track of the material identity for the batch being processed. In some instances, batch processes or continual processes may be utilized. The controller may continuously monitor the materials throughout the process. The controller may communicate with sensors that may perform spot-checks of the material throughout the process to perform quality control. The sensors may be provided at one or more of the processing devices at any point along the rubber recycling process. In some embodiments, the controller need not communicate with every assembly in processing arrangement, and may selectively communicate with particular devices and/or sensors.

In some embodiments, the end product may be packaged as described elsewhere herein. The controller may be communicating with the packaging system, and may be utilized in generating a product specification for the packaged end product material.

The controller may cause any of the apparatuses described to operate in a manner to yield a desired end product. In some instances, the controller may utilize an algorithm or determine how particular pieces of equipment should operate given the raw materials and/or the desired end products. In other embodiments, look-up tables or records may be provided that may provide specifications for equipment operations given the raw materials and/or the desired end products. Feedback systems may or may not be utilized.

Any of the assemblies and/or steps described herein may occur in any order. For example, they may occur in the sequence that they are described. They may also occur in any other sequence (e.g., granulating may occur before separation, etc.). In some instances, components of the various assemblies described may or may not be provided before or after components of other assemblies so that the steps may be intermixed. For example, a separating step may occur, then a granulating step, then another separating step, then another granulating step and/or blending step. Any of the steps described herein may also be optional and similar steps and/or assemblies may be substituted for any of the steps or assemblies described herein.

Systems

The various units of the processing system can be provided by a variety of manufacturers, including MTB Recycling, Trept, France and Engineering Services (Bridgend) Limited, Bridgend, United Kingdom. The system, as described, above can be controlled from two control stations and relay panels, fitted with stop and start buttons and other metering devices. The various units can be electrically interlocked to ensure the plant is started in an orderly manner and is closed down in an orderly manner in the event of emergency.

The various units of the system can also include shear feed conveyors, splitter feed conveyors, steel outfeed conveyors, screw feed conveyor, drum separator screw feed conveyors, drum separators, air-cleaning systems, and electrical cabinets. A shear feed conveyor can be used to move materials to a shearing unit. A steel outfeed conveyor can be used to transport steel away from processing unit. Drum separators can be used for magnetic separations, or any other type of separation.

The systems described herein can include an air-cleaning system for removing materials from the air. The air-cleaning system can reduce the amount of particulates in the air and/or reduce the chance of spontaneous combustion or other hazardous conditions.

In some embodiments of the invention, the processing units and be cleaned between groups or batches of material such that the products from each group or batch are substantially free of products from another group or batch. Cleaning between groups can improve product quality and reduce the chance of undesired components being present in the product. Cleaning can include washing, gas-blowing, manual cleaning, chemical washing, air-cleaning, replacement of parts, substitution of parts, switching of processing units, or any combination thereof.

EXAMPLE 1

FIGS. 3A, 3B, 3C, and 3D demonstrate an exemplary system as described herein. After raw material, such as waste or redundant rubber, is selected by a process, such as a process of the invention carried out by trained personnel or automated system (e.g., optical scanning), the specified raw material is delivered and loaded for a first shredding process. A rotary shear can initiate the shredding process by specified size of material, such as a tire. In one example, the rotary shear may be a model 175 H.P. machine, which may have a heavy-steel body which may be fitted with 2 slow speed contra rotating shafts. The shafts may be fitted with hook knives, interspaced with protective discs. The shafts may be driven by individual hydraulic motors, each fitted with a reduction gearbox. The bearings may be oil filled and the machine and cases may be sealed to avoid ingress of deleterious liquids. The machine may be mounted on a fabricated steel support structure with access ladder, and may be fitted with a fabricated in-feed hopper and discharge chute. Hydraulic motors may be provided with hydraulic oil from a separate self-contained power pack, which may be complete with oil cooler and electrical controls. The motor may be a 130 kW, 415 V, 50 Hz motor and the knives may be 120 mm 2 hook knives. Any other rotary shear with any other specifications or configurations may be utilized.

The shredded material is then transported by a troughed out feed conveyor and divided by a dividing chute and conveyor, from which the divided material is transported by a preshredder feed conveyor by specified shred sizes. The specified size shredded processed rubber material is reduced by a first preshredder wherein a size of shredded material can be chosen or programmed by a user. In one implementation, the troughed out feed conveyor may be fitted with a rubber chevron belt to elevate product from rotary shear to the dividing chute and may be fitted with steel supporting legs. The width of the conveyor may be about 900 mm, the drum centers may be 5 m, and the motor may be a 6 kW motor. In some examples, the dividing chute and conveyor may include a chute that divides and transfers shred to dividing conveyors, and then onwards to shredder feed conveyors. The dividing chute and conveyor may have a width of 800 mm, the drum centers may be 5 m, and the motor may be a 3 kW motor. In accordance with some embodiments, the preshredder feed conveyor may be a rubber chevron belt conveyor to elevate the shred to the preshredder. The width of the conveyor be about 800 mm, the drum centers may be 6 m, and the motor may be a 3 kW motor. Any other conveyors with any other measurements or configurations may be utilized. The first preshredder may be a machine with a heavy-duty rotator fitted with knives in a chevron formation rotating on a heavy fabricated body. The body may be fitted with two rows of static adjustable knives and internally lined in high wear areas with wear resistance liner plates. The shaft may be supported in heavy duty bearing grease lubricated from a central point. In addition, two mist spray units may be fitted to cool and lubricate the knives and blades of the machine. The grids may be easily removable and the machine may be fitted with a special hydraulically operated lowering device to facilitate removal. The machine may be belt driven from an electric motor and may be fitted with a protective clutch against overload condition. The shredder product may be removed via a steel-vibrating conveyor. The opening size may be about 2150 mm×900 mm. The grid holes may be 50 mm in diameter. The rotor speed may be about 190 rpm. The motor may operate at 132 kW at 1000 rpm. Any of operating conditions and/or specifications relating to the preshredder are provided by way of example only, and any other preshredder may be used.

The process material is then transported by a troughed transfer conveyor to another preshredder that further shreds the rubber material to a programmed size, which is then moved by a vibrating conveyor with a magnetic table for the removal of steel particles. In one example, the troughed transfer conveyor may be fitted with a rubber chevron belt transfer material to conveyor preshredder. The width of the conveyor may be about 600 mm, the drum centers may be 5 mm, and the motor may be a 2 kW 415 V 50 Hz motor. Any other conveyor with any other specifications or measurements may be used. The second preshredder may be a machine with a heavy-duty rotator fitted with knives in a chevron formation rotating on a heavy fabricated steel body. The body may be fitted with two rows of static adjustable knives and internally lined in high wear areas with wear resistance liner plates. The shaft may be supported in heavy duty bearing grease lubricated from a central point. The grids may be easily removable and the machine may be fitted with a special hydraulically operated lowering device to facilitate removal. The machine may be belt driven from an electric motor and may be fitted with a protective clutch against overload condition. The shredded product may be removed via a steel-vibrating conveyor. The opening size may be about 1200 mm×450 mm. The grid holes may be 30 mm in diameter. The rotor speed may be about 395 rpm. The motor may operate at 132 kW at 1000 rpm 415 V 50 Hz. Any of operating conditions and/or specifications relating to the preshredder are provided by way of example only, and any other preshredder may be used. The magnetic table may operate so that the material, now under 30 mm from the out feed conveyor is carried on a rubber belt vibrating conveyor. Agitation may be achieved by power driven eccentric rubber covered wheels mounted below the top belt. An overband magnet may be suspended from a steel frame above the rubber belt and may carry off steel particles from the product. Plates likely to be affected by the magnets may be supplied in non-magnetic steel. The belt width may be about 800 mm, the drum centers may be about 2000 mm, and the total power may be about 5 kW, 415 V, 50 Hz. Any other magnetic table dimensions or configurations, or magnetic separation techniques may be utilized.

As demonstrated in FIGS. 3A, 3B, 3C, and 3D, after the magnetic table, the steel particles removed from the rubber can then be transported by a troughed steel discharge conveyor to an area where a decision to recycle or select the metal for alternative process can be made. The "most metal free" processed rubber material can be an end product for sale and go by another conveyor to a storage hopper for packing and customer delivery. The troughed steel discharge conveyor may be fitted with a chevron belt to transfer material to dump. The troughed transfer conveyor may be fitted with a chevron belt to transfer material to the storage hopper. The conveyor width may be about 600 mm, the drum centers may be 5 m, and the motor may be a 2 kW, 415 V, 50 Hz motor. The storage hopper may be a fabricated steel structure flexible mounted in a frame to reduce wear and jamming. The design may incorporate steep sides and an extra-wide steel belt to dramatically reduce bridging and obviate the necessity of fitting special anti-bridging devices. An adjustable gate may control the flow and the metal belt out-feed conveyor may be automatically controlled from the shredder to provide smooth loading and optimize the performance of the downstream equipment. The hopper size may be about 2900 mm×1390 mm. The outfeed conveyor may be about 800 mm wide×3250 mm. The motor may operate at 3 kW, 415 V, and 50 Hz. Any of these devices provided herein are provided by way of example only, and any other comparable devices or devices with varying dimensions or characteristics may be utilized.

As shown in FIGS. 3A, 3B, 3C, and 3D, the processed rubber material can also go forward by a conveyor from the process as described or from a storage hopper. The conveyor may be a troughed transfer conveyor fitted with a chevron belt to transfer material to a recovery granulator. The conveyor may have a belt width of 600 mm, a drum center of 5000 mm, and a 2 kW, 415 V, 50 Hz motor. Any other conveyor with any other features or configurations may be used.

Personnel can then make a decision on the final shape or size of the end product material sent to the recovery granulator. The shape or size can be filtered by a grid with used defined specifications. Once the product goes through the recovery granulator, the processed material can pass through an overband magnet for the removal of any additional metal (e.g., steel) in the material. Once through the overband magnet, the bucket conveyor elevates the processed material to the entrance hopper for a Zigzag conveyor as shown in FIGS. 3A, 3B, 3C, and 3D. In some implementations, the recovery granulator may have an opening size of 1000 mm×300 mm with a grid hole size of 12 mm in diameter. The rotor speed may be about 540 rpm, and the motor may operate at 110 kW, 1500 rpm, 415 V, and 50 Hz. The bucket conveyor may elevate material to the entrance hopper on the zigzag by means of rubber bucks and may be chain driven. The conveyor may have a discharge height of about 3340 mm, and the motor may be a 2 kW, 415 V, and 50 Hz motor. Apparatuses of different dimensions or specifications may be used.

The material is pneumatically fed from the integral hopper into the Zigzag at the top. Heavy components continue down the Zigzag for collection and removal for further process or alternative recycling. Rubber granules from the Zigzag are separated in the cyclone and discharged to a screw conveyor to feed into the recovery granulator. Dust removal can be controlled through the Top Hat of the cyclone by filtration. A bin or conveyor for further processes or alternative recycling can remove heavy components. In accordance with one example, the material may be fed via a rotary valve into the zigzag, which may be constructed in steel. Rubber may be discharged via the top pneumatically and heavy components, valves, etc. may continue down the zigzag to be discharged at the base into a customer's bin. Rubber granules from the zigzag may be separated in the cyclone and discharged via a rotary valve to a screw conveyor. Air and dust may be removed from the top hat of the cyclone and may feed to the filter. The rotary valve motor may operate at 0.75 kW while the fan motor may operate at 7.5 kW. Such configurations are provided by way of example only.

Programmed material is discharged from the cyclone to the second series granulator by a screw elevator. The screw elevator can deliver the programmed material to the final recovery granulator for granulation to the specified end product dimension regulated by the appropriate grid sizes installed in the granulator according to the end product required. The screw elevator may utilize a 22 kW, 415 V, 50 Hz motor. In some implementations, the recovery granulator may having an opening size of 1000 mm×330 mm and a grid hole size with a 5 mm diameter. The rotor speed may be about 540 rpm, and the motor may operate at 110 kW, 1500 rpm, 415 V, and 50 Hz.

Programmed material is elevated away from the granulator and discharged onto the selecting table using the screw elevator conveyor. The screw elevating conveyor may optionally have a discharge height of 2500 mm and a 2.2 kW, 415 V, 50 Hz motor. Fiber and dust are removed from the product on the selecting table and the processed is finally sized using vibrating sieves pre-set to the end product specification. At the selecting table, screw elevator conveyors to pass over the magnetic separator for a final steel check and removal transfer the material. The selecting table machine may remove fiber and dust, and may size crumbs into two (or more) streams by vibrating sieves. About 25 kW in power may be used. In one case, the screw elevating conveyor may utilize a 2.2 kW 415 V 50 Hz motor.

End product produced and finally checked through the magnetic separator is conveyed away from the separator by a screw elevating conveyor to be packed and enter finished stock control. The magnetic separator may be using 5 kW of power. Optionally, the screw elevating conveyor may utilize a 2.2 kW 415 V 50 Hz motor.

In some embodiments, after the material has gone through the selecting table and an end product is produced, if further blending is determined to be required, it may be transferred to a selecting table once more via a screw elevating conveyor. The selecting table machine may again remove fiber and dust. This may be repeated until it is determined that the material has been sufficiently blended. If further blending is not required, then the end product may be packaged.

The supply may include air ducting, hoods and filtration on the pre-shredder, shredder, granulators and/or selecting table. Five units, each of 5.5 kW power consumption may be provided and sited adjacent to the equipment requiring air cleaning. The filter bags may be vibrated to avoid dust clogging the filter. The total power used may be about 27.5 kW.

Unsuitable material for specified end product use is removed by the separator and is transported away by bin or conveyor for further process or alternative use.

After the end product has been processed by the exemplary method, trained personnel or computer systems can perform stock control for inspection labeling and delivery processes. The details of end products and traceability details can be recorded. Full information can be provided to a customer, for example, on invoices. In addition, the systems also provide ISO standard particulars to customers.

Starting and electrical control of the equipment may be from one, two, or more centrally located control stations, per line, fitted with start/stop buttons, ammeters, or other controls. The starting and stopping sequences of the equipment may be interlocked to ensure that accidental stoppage of one item of equipment may give an orderly and sequential stoppage of all items on the production line. In addition, emergency stop buttons may be located strategically about the plant to ensure safety of the operators.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A process for recycling waste rubber compound for a desired end product comprising:
   a. receiving waste rubber compound;
   b. selecting the desired end product having a selected chemical composition;
   c. identifying the chemical composition of the waste rubber compound, wherein said identifying is carried out by trained personnel; and
   d. processing said waste rubber compound by the chemical composition of the waste rubber compound using processing equipment, wherein said processing is based upon the desired end product of manufacture, thereby generating a desired recycled rubber;
   e. delivering said recycled rubber compound to a user.

2. The process of claim 1, wherein the waste rubber compound is tagged with identifying information.

3. The process of claim 1, wherein said identifying includes presenting said trained personnel with a user interactive interface.

4. The process of claim 1, wherein the processing step comprises processing based on magnetic properties.

5. The process of claim 1, wherein the processing step comprises processing based on density.

6. The process of claim 1, wherein the recycled rubber is accompanied by a specification sheet that contains information regarding the recycled rubber compound.

7. The process of claim 1, wherein the processing equipment includes at least one of a cyclone or granulator.

8. A process for recycling rubber compound comprising:
   a. selecting a desired object having a selected chemical composition;
   b. assessing waste rubber compounds according to a chemical composition of the waste rubber compounds;
   c. selecting at least one of said waste rubber compounds for processing of a certain chemical composition as assessed in step b), wherein the compound is selected for the manufacture of the desired object;
   d. processing the selected waste rubber compound(s) of step b); and
   e. processing said separated waste rubber compound(s) into compound for said manufacture of said desired object.

9. The process of claim 8, wherein the assessed waste rubber compounds are tagged with identifying information.

10. The process of claim 8, wherein the separating step includes removing toxic materials.

11. The process of claim 8, wherein the processing step includes removing metals.

12. The process of claim 8, wherein said processing is carried out by processing equipment that is variable and programmable.

* * * * *